United States Patent [19]

Mann et al.

[11] 4,329,064

[45] May 11, 1982

[54] HYDROSTATIC-MECHANICAL DRIVE FOR VEHICULAR CEMENT MIXERS

[75] Inventors: Egon Mann; Helmut Eymüller, both of Friedrichshafen, Fed. Rep. of Germany

[73] Assignee: Zahnradfabrik Friedrichshafen AG, Friedrichshafen, Fed. Rep. of Germany

[21] Appl. No.: 116,978

[22] Filed: Jan. 30, 1980

[30] Foreign Application Priority Data

Feb. 3, 1979 [DE] Fed. Rep. of Germany ....... 2904107

[51] Int. Cl.³ .............................................. B28C 5/18
[52] U.S. Cl. ...................................... 366/61; 60/455; 60/469; 366/62
[58] Field of Search ...................... 366/60–63; 60/469, 455

[56] References Cited

U.S. PATENT DOCUMENTS

| | | | |
|---|---|---|---|
| 2,676,003 | 4/1954 | Oury | 366/61 |
| 2,968,915 | 1/1961 | Feistel, Jr. | 366/61 |
| 3,160,398 | 12/1964 | Green | 366/61 |
| 3,190,621 | 6/1965 | Green et al. | 366/61 |
| 3,805,082 | 4/1974 | Murray | 60/469 |

FOREIGN PATENT DOCUMENTS 2139492  5/1973  Fed. Rep. of Germany ........ 366/61

Primary Examiner—Philip R. Coe
Assistant Examiner—Timothy F. Simone
Attorney, Agent, or Firm—Karl F. Ross

[57] ABSTRACT

In a cement-mixer truck having a mixing drum rotated via a step-up transmission by a hydrostatic motor in turn energized by a power pump driven by the vehicle engine, the motor is disposed in a chamber at least partially filled with coolant replenished by leakage from the power pump and the motor and by oil from a valve housing supplied via a pressure-regulating and a bleeding valve respectively tapping high-pressure and low-pressure pumping conduits of a hydraulic circuit. The motor coolant chamber is surrounded by an oil reservoir connected at an output via an internal filter and a second engine-driven pump to the hydraulic circuit for feeding oil thereto and at an input via a heat exchanger to the motor chamber for drawing hot fluid from the motor bath, the reservoir serving in part to reduce noise from the hydraulic motor. A ventilating fan at the heat exchanger and a water pump are driven directly by the same shaft that is connected to the step-up transmission.

17 Claims, 3 Drawing Figures

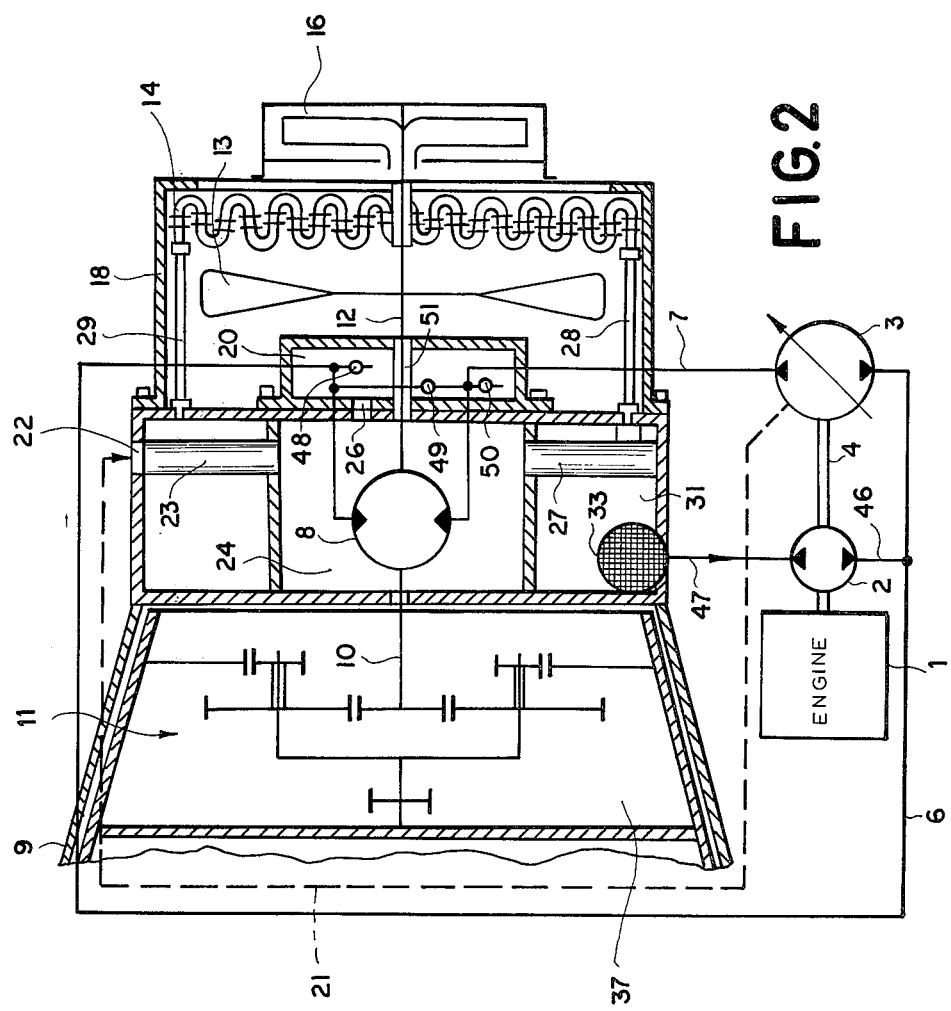

4,329,064

HYDROSTATIC-MECHANICAL DRIVE FOR VEHICULAR CEMENT MIXERS

FIELD OF THE INVENTION

Our present invention relates to a hydrostatic-mechanical drive system, in particular for cement-mixer trucks.

BACKGROUND OF THE INVENTION

Vehicular cement mixers are known (e.g. German open application Ser. No. 2,139,492) in which a hydrostatic motor driven by the vehicle engine via a power pump rotates a mixing drum via a mechanical transmission. An ancillary transmission is necessary to drive a fan for cooling the pumping oil.

Conventional cement-mixer drive systems have various disadvantages. For example, the housing space that the hydrostatic motor requires is frequently used for other elements, and the noise produced by the motor cannot be lessened. Furthermore, the bulkiness of the heat exchanger and the oil reservoir necessitates extensive hose connections between the motor and the heat exchanger and between the exchanger and the oil reservoir. The transmission driving the cooling fan must also be provided with a step-down power train.

OBJECTS OF THE INVENTION

An object of our present invention is to provide for cement mixers a hydrostatic-mechanical drive assembly which is relatively compact.

Another object of our present invention is to provide such a drive assembly which significantly reduces noise production.

SUMMARY OF THE INVENTION

A cement mixer according to our present invention comprises a frame rotatably supporting a mixing drum and carrying a tapping assembly for extracting cement mixture from the drum and a loader for conveying raw materials into the drum. A drive housing secured to the frame has a chamber in which a hydrostatic motor is disposed for rotating the drum. A power train or transmission in the housing is connected to the motor and to the drum for transmitting rotary power thereto from the motor, while the same is linked to at least a partially hydraulic drive on the frame for receiving energizing or pumping fluid. A reservoir or tank for storing pumping fluid, preferably oil, is secured to the housing and substantially surrounds the motor chamber, whereby noise produced by the motor is absorbed; the tank is connected to the hydraulic drive for recharging the same with pumping oil and to the motor chamber for replenishing the supply in the tank with oil entering the chamber at least in part as leakage from the motor.

According to another feature of our present invention, the transmission includes a torque-increasing mechanical power train, e.g. a set of planetary gears, driven by the motor via a shaft. A heat exchanger communicates with the chamber and with the storage tank for cooling oil transferred thereto, while a fan juxtaposed to the heat exchanger for moving air past the same is operated by an extension of the drive shaft.

According to another feature of our present invention, the hydraulic drive includes a low-pressure conduit connected to the motor for guiding pumping oil therefrom. A bleeder valve communicating with the motor chamber and connected to the low-pressure conduit transfers oil therefrom to the chamber for ensuring an adequate supply of motor-cooling fluid. Further oil may be supplied to the chamber by a pressure-regulating valve connected to a high-pressure line or conduit in the hydraulic drive system. The valves may be enclosed in a valve casing secured to the housing, the shaft extension for driving the fan traversing this casing.

According to yet another feature of our present invention, a water pump for supplying the cement-mixing drum is operationally linked to the motor by the shaft extension, which is preferably integral with the drive shaft, and by a pair of bevel gears disposed between the valve casing and the fan in a gear housing communicating with the motor chamber via a sleeve traversing the valve casing.

Pursuant to further features of our present invention, an oil filter inserted into a hydraulic circuit including the tank, the drive, the motor and the motor chamber is disposed inside the tank for cleaning oil prior to the feeding thereof from the tank to the drive; a feed pump may be provided between the tank and the drive for facilitating the recharging of the same. The heat exchanger is tied to the motor chamber and to the storage tank by means of plug connections, while a hose extends from a power pump in the hydraulic drive system to the chamber for delivering pump leakage oil thereto. Preferably, the storage tank is annular.

Advantages of a hydrostatic-mechanical drive assembly according to our present invention include structural compactness, implemented by the integration of the hydrostatic motor with the planetary gearing within the drive housing, by absence of ancillary gearing for transmitting power to the fan, and by the disposition of the oil filter within the oil storage tank. The compact arrangement permits simple and easily serviceable plug connections between the heat exchanger, on the one hand, and the oil tank and the motor chamber, on the other hand. The surrounding of the motor chamber by the oil storage tank contributes to a great reduction in the noise from the motor.

BRIEF DESCRIPTION OF THE DRAWING

These and other features of our present invention will now be described in detail, reference being made to the accompanying drawing in which:

FIG. 2 is a partially schematic cross-sectional view of a drive housing attached to the frame of FIG. 1, showing a hydraulic-mechanical drive system according to our present invention for rotating the drum of FIG. 1.

SPECIFIC DESCRIPTION

Figure 1:
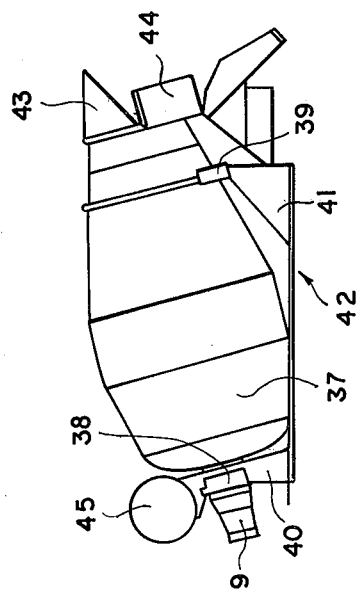
FIG. 1 is a partially schematic elevational view of a cement-mixer frame and mixing drum, conventional in the art.

As shown in FIG. 1, a cement mixer, in particular a mixer mounted on a truck for mobility, includes a mixing drum 37 rotatably mounted by means of roller bearings 38, 39 on a pair of substantially upright supports 40, 41 forming parts of a frame 42 which may be integral with the vehicle frame. Attached to frame 42 are a feed hopper 43 for conveying raw materials, e.g. sand, lime, into drum 37 and a cement-tapping assembly 44 for extracting the mixture from the drum. A water-storage tank 45 is mounted on support 40 for ensuring a requisite supply of water to drum 37 during transport by the truck vehicle.

As shown in FIG. 2, a drive housing 9 secured to support 40 at bearing 38 includes a chamber 24 in which a hydrostatic motor 8 is disposed for rotating drum 37. Motor 8 is operatively linked to the drum by means of a shaft 10 and a set of planetary gears 11 serving to increase the torque (or decrease the rotary speed) transmitted from motor 8 via shaft 10. Motor 8 is in turn energized by a hydraulic drive including high- and low-pressure lines or conduits 6, 7 and a variable-displacement pump 3 driven by an internal combustion engine 1 of the cement-mixer vehicle via a shaft 4. This shaft also powers a feed pump 2 working into hydraulic circuit 3, 6, 7, 8 via an output duct 46 extending to line 6 or, preferably, to line 7 (not shown). Pump 2 has an input duct 47 extending from an oil storage tank 31 integral with housing 9 and annularly surrounding chamber 24. Inside storage tank 31 is provided an oil filter 33 for cleaning pumping fluid prior to the feeding thereof by pump 2 to lines 6, 7, this filter being readily accessible from outside housing 9 for maintenance purposes.

Pump 2 replenishes the oil in a reservoir contained in tank 31 by drawing fluid from chamber 24 via a plug-mounted connection 29, a heat exchanger 14, another plug connection 28 and a pipe guide 27 radially traversing tank 31 from chamber 24. Fluid enters chamber 24 as leakage from motor 8 and as overflow from a valve casing 20 which encloses a pressure-regulating valve 48 connected to high-pressure line 6 for relieving the same of excess pressure, a bypass valve 49 bridging lines 6 and 7, and a bleed valve 50 for tapping low-pressure line 7, excess oil leaving casing 20 via an aperture 26. Chamber 24 is further supplied with leakage oil from pump 3 by means of a hose 21 extending therefrom to an input connection 22 on housing 9 and a pipe guide 23 radially traversing tank 31. Thus, motor 8 is ensured of having an adequate supply of cooling fluid in chamber 24 by the outputs of valves 48, 50 supplementing the leakage from units 3, 8.

Air is sucked over or through heat exchanger 14 by a fan 13 rotated by motor 8 via an extension 12 of shaft 10, this extension passing through a sleeve 51 traversing casing 20. A water pump 16 for feeding water from tank 45 (FIG. 1) to drum 37 is bolted onto a heat-exchanger mounting or bracket 18 which is in turn bolted onto housing 9; pump 16 is drivingly connected to motor 8 via extension 12. This extension may be formed integrally with shaft 10. In addition to the advantages provided by this direct driving connection, a mixing device according to our present invention has a reduced noise output due to the substantially complete enclosing of motor 8 by oil-filled spaces, i.e. in particular by tank 31 but also by casing 20.

Figure 3:
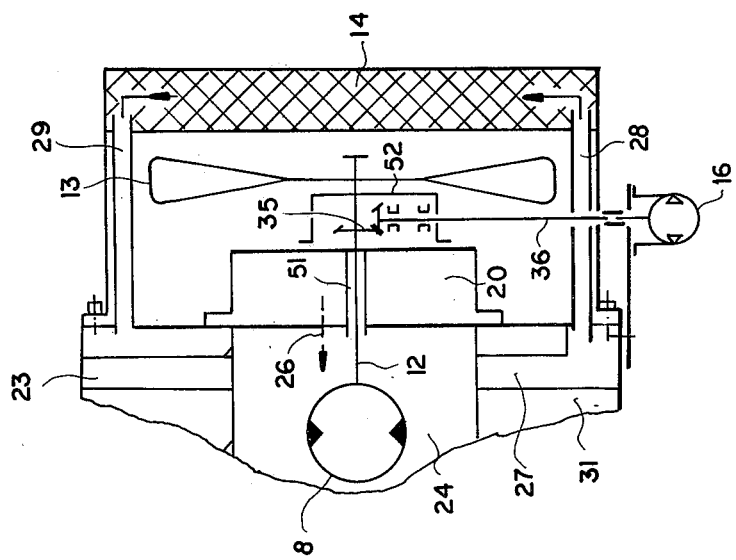
FIG. 3 is a view similar to FIG. 2.

As shown in FIG. 3, water pump 16 may be bolted to housing 9 directly rather than via bracket 18 and driven by motor 8 via extension 12, a pair of bevel gears 35 and another shaft 36 oriented perpendicularly with respect to extension 12. Gears 36 are mounted in a gear housing or casing 52 communicating with chamber 24 via sleeve 51 for receiving lubricating oil from the bath cooling motor 8.

We claim:

1. A cement mixer comprising:
   a frame;
   a cement-mixing drum rotatably mounted on said frame;
   tapping means on said frame for drawing cement mixture from said drum;
   loading means on said frame for conveying raw materials into said drum;
   a drive housing attached to said frame and provided with a chamber stationary with respect to said frame;
   a hydrostatic motor disposed in said chamber for rotating said drum, said chamber collecting leakage fluid from said motor;
   transmission means in said housing connected to said motor and to said drum for transmitting rotary power thereto from said motor;
   drive means including a pump on said frame connected to said motor by hydraulic lines for energizing same with said fluid;
   a tank rigidly connected to said housing and substantially surrounding said chamber for storing pumping fluid, whereby noise produced by said motor is absorbed; and
   means connecting said tank to said lines for recharging same with pumping fluid and to said chamber for replenishing said tank with fluid leaked into said chamber from said motor.

2. The cement mixer defined in claim 1 wherein said transmission means includes a torque-increasing mechanical power train driven by said motor via a shaft.

3. The cement mixer defined in claim 2, further comprising a heat exchanger communicating with said chamber and with said tank for cooling oil transferred thereto and fan means juxtaposed to said heat exchanger and operated by an extension of said shaft for moving air past said heat exchanger.

4. The cement mixer defined in claim 3 wherein said lines include a low-pressure conduit connected to said motor for guiding pumping oil therefrom, further comprising bleed valve means communicating with said chamber and connected to said conduit for extracting oil therefrom for ensuring an adequate supply in said chamber for cooling said motor.

5. The cement mixer defined in claim 4 wherein said drive means further includes a high-pressure line extending to said motor for feeding pumping oil thereto, further comprising pressure-regulating valve means communicating with said chamber and connected to said line for controlling pressure therein and for contributing to the coolant supply in said chamber, and a valve casing secured to said housing for containing said valve means.

6. The cement mixer defined in claim 5 wherein said extension traverses said casing.

7. The cement mixer defined in claim 6, further comprising a water pump for supplying said drum, said water pump being operationally linked to said motor via said extension.

8. The cement mixture defined in claim 7 wherein said water pump is driven by said motor via said extension and bevel gears.

9. The cement mixer defined in claim 8 wherein said gears are disposed between said casing and said fan means.

10. The cement mixer defined in claim 9 wherein said gears are disposed in a casing communicating with said chamber.

11. The cement mixer defined in claim 3 wherein said extension is integral with said shaft.

12. The cement mixer defined in claim 3 wherein said heat exchanger is coupled to said chamber and to said tank by means of plug connections.

13. The cement mixer defined in claim 1, further comprising hose means extending from said pump to said chamber for delivering pump leakage oil thereto.

14. The cement mixer defined in claim 1 wherein said tank is substantially annular.

15. The cement mixer defined in claim 1, further comprising a feed pump inserted between said tank and said lines for supplying pumping oil thereto.

16. The cement mixer defined in claim 1, further comprising an oil filter inserted into a hydraulic circuit including said tank, said lines, said motor and said chamber.

17. The cement mixer defined in claim 16 wherein said filter is disposed inside said tank for cleaning oil prior to the feeding thereof from said tank to said lines.

* * * * *